(12) United States Patent
Oh et al.

(10) Patent No.: US 8,681,743 B2
(45) Date of Patent: Mar. 25, 2014

(54) APPARATUS AND METHOD FOR SELECTING FRAME STRUCTURE IN MULTIHOP RELAY BROADBAND WIRELESS ACCESS COMMUNICATION SYSTEM

(75) Inventors: Chang-Yoon Oh, Yongin-si (KR); Hyun-Jeong Kang, Seoul (KR); Young-Bin Chang, Anyang-si (KR); Jae-Weon Cho, Suwon-si (KR); Hyoung-Kyu Lim, Seoul (KR); Yeong-Moon Son, Yongin-si (KR); Sung-Jin Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1185 days.

(21) Appl. No.: 11/953,358

(22) Filed: Dec. 10, 2007

(65) Prior Publication Data

US 2008/0137584 A1 Jun. 12, 2008

(30) Foreign Application Priority Data

Dec. 8, 2006 (KR) .................. 10-2006-0125020
Jan. 8, 2007 (KR) .................. 10-2007-0002220

(51) Int. Cl.
*H04W 4/00* (2009.01)

(52) U.S. Cl.
USPC ..................... 370/332; 370/331; 370/334

(58) Field of Classification Search
USPC ............................................. 370/332
See application file for complete search history.

(56) References Cited

U.S. PATENT DOCUMENTS

| 4,107,608 | A | * | 8/1978 | Saburi .................. 370/324 |
| 6,108,318 | A | | 8/2000 | Kolev et al. |
| 2003/0169697 | A1 | * | 9/2003 | Suzuki et al. .......... 370/310 |
| 2005/0259676 | A1 | | 11/2005 | Hwang |
| 2006/0171328 | A1 | * | 8/2006 | Ohtani et al. .......... 370/252 |
| 2006/0239265 | A1 | * | 10/2006 | Son et al. .............. 370/390 |
| 2008/0080474 | A1 | * | 4/2008 | Kitchin ................. 370/349 |
| 2008/0107091 | A1 | * | 5/2008 | Ramachandran ......... 370/338 |

FOREIGN PATENT DOCUMENTS

| KR | 1020000075846 | 12/2000 |
| KR | 1020030080874 | 10/2003 |

OTHER PUBLICATIONS

Mike Hart et al: "Frame Structure for Multihop Relaying Support", IEEE 802.16 Broadband Wireless Access Working Group, Nov. 7, 2006.
Hang Zhang et al: "RS Configuration Signaling", IEEE 802.16 Broadband Wireless Access Working Group, Nov. 7, 2006.
Hyunjeong Kang et al: "Initial Relay Region Indicator", IEEE 802.16 Broadband Wireless Access Working Group, Nov. 7, 2006.
Su Chang Chae et al: "Hybrid Relay Structure Within a Single Frame", IEEE 802.16 Broadband Wireless Access Working Group, Nov. 7, 2006.

(Continued)

*Primary Examiner* — Shripal Khajuria
(74) *Attorney, Agent, or Firm* — The Farrell Law Firm, P.C.

(57) ABSTRACT

Apparatus and method for selectively using a frame structure adequate for a system environment in a multihop relay wireless communication system are provided. The method includes generating a control signal including the frame information; and transmitting the control signal to a child Relay Station (RS). Accordingly, the frame structure adequate for the system environment can be used, and the transmission delay and the tradeoff between the overheads in each frame structure can be freely selected.

21 Claims, 11 Drawing Sheets

(56) References Cited

OTHER PUBLICATIONS

HyunJeong Kang et al: "Indication of Changes in the Offset of Relay Region", IEEE 802.16 Broadband Wireless Access Working Group, Nov. 7, 2006.

ChangYoon Oh et al: "Frame Structure for 2-Hop Relay", IEEE 802.16 Broadband Wireless Access Working Group, Nov. 7, 2006.

YoungBin Chang et al: "Frame Structure for Multi-hop Relay", IEEE 802.16 Broadband Wireless Access Working Group, Nov. 7, 2006.

Kanchei Loa et al: "RS Network Entry", IEEE 802.16 Broadband Wireless Access Working Group, Nov. 7, 2006.

* cited by examiner

APPARATUS AND METHOD FOR SELECTING FRAME STRUCTURE IN MULTIHOP RELAY BROADBAND WIRELESS ACCESS COMMUNICATION SYSTEM

PRIORITY

This application claims priority under 35 U.S.C. §119(a) to an application filed in the Korean Intellectual Property Office on Dec. 8, 2006 and assigned Serial No. 2006-125020 and an application filed in the Korean Intellectual Property Office on Jan. 8, 2007 and assigned Serial No. 2007-2220, the disclosure of each of which is herein incorporated by reference.

BACKGROUND OF THE INVENTION

1. Field of the Invention

The present invention relates generally to a multihop relay wireless communication system, and in particular, to an apparatus and method for selectively using a frame structure adequate for a system environment in the multihop relay wireless communication system.

2. Description of the Related Art

To enable rapid communications and accommodate more traffic, a fourth generation (4G) communication system includes cells having very small radius. The design of a centralized 4G communication system is proving difficult. In this respect, the 4G communication system needs to control and implement in a distributed manner and to actively cope with an environmental change such as joining of a new base station. That is, the 4G communication system requires a self-configurable wireless network capable of configuring a wireless network in an autonomous or distributed manner without the control of a central system.

In order to practically implement the self-configurable wireless network, the 4G communication system needs to adopt a technique applied to an ad-hoc network. In other words, the 4G communication system must realize the self-configurable wireless network by adopting a multihop relay scheme of the ad-hoc network to the wireless network including a stationary base station.

Since a typical wireless communication system communicates along a direct link between a stationary base station and a mobile station, it is quite easy to construct a radio communication link of high reliability between the mobile station and the base station. However, since the position of the base station is fixed in the wireless communication system, flexibility of the wireless network configuration is low. Thus, in the wireless environment under the severe change of traffic distribution or traffic requirement, the wireless communication system has difficulty in providing efficient services.

To overcome those shortcomings, the wireless communication system can make use of a relay service which transfers data on multiple hops via neighboring mobile stations or relay stations. The relay wireless communication system is able to rapidly reconfigure the network with respect to the communication environment change and to more efficiently operate the entire network. By establishing a multihop relay path via the relay station between the base station and the mobile station, the wireless communication system can provide a radio channel of far better channel condition to the mobile station. In a cell boundary under the unfavorable channel condition from the base station, the wireless communication system can provide the rapid data channel and expand the cell coverage area by use of the multihop relay scheme via the relay station.

FIG. 1 illustrates a general multihop relay wireless communication system.

A Base Station (BS) 100 in FIG. 1 is connected to a Mobile Station (MS) 110 in a service coverage area 101 by a direct link. In contrast, the BS 100 is connected to an MS 120, which travels outside the service coverage area 101 in the bad channel condition, by a relay link via a Relay Station (RS) 130.

The BS 100 can communicate with MSs, which travel in the outskirts of the service coverage area 101 or in a shadow area under the severe shielding by buildings in the hostile channel condition, by way of the RS 130. To relay signals between the BS and the MS via the RS, the wireless communication system needs to establish not only a BS-MS link but a BS-RS link and an RS-MS link.

However, since the conventional wireless communication system does not take into account the RS, the conventional wireless communication system does not allocate resources for the BS-RS link and the RS-MS link as shown in FIG. 2.

FIG. 2 depicts a frame structure of an Institute of Electrical and Electronics Engineers (IEEE) 802.16e system.

The frame structure of the conventional wireless communication system is shown in FIG. 2.

The frame of FIG. 2 includes a DownLink (DL) subframe 200 and an UpLink (UL) subframe 210.

The DL subframe 200 includes a sync channel, control information, and a DL burst transmitted from the BS to the MS.

The UL subframe 210 includes control information and an UL burst transmitted from the MS to the BS.

As discussed above, not considering the RS, the conventional wireless communication system allocates the resources merely for the BS-MS link. To adopt the multihop relay scheme, the wireless communication system requires a frame structure which allocates the resources to not only the BS-MS link but also the BS-RS link and the RS-MS link.

SUMMARY OF THE INVENTION

An aspect of the present invention is to substantially solve at least the above problems and/or disadvantages and to provide at least the advantages below. Accordingly, an aspect of the present invention is to provide a frame constituting apparatus and method for adopting a multihop relay scheme in a wireless communication system.

Another aspect of the present invention is to provide an apparatus and method for using a frame structure adequate for a system environment in a multihop relay wireless communication system.

A yet another aspect of the present invention is to provide an apparatus and method for sending frame structure information to RSs using control information in a multihop relay wireless communication system.

A still another aspect of the present invention is to provide an apparatus and method for providing frame structure information to an initially accessing RS in a multihop relay wireless communication system.

A further aspect of the present invention is to provide an apparatus and method for providing frame structure change information to an accessing RS when the frame structure is changed in a multihop relay wireless communication system.

The above aspects are achieved by providing a method for transmitting frame information at a serving node in a multihop relay wireless communication system, which includes generating a control signal including the frame information; and transmitting the control signal to a child Relay Station.

According to one aspect of the present invention, a method for confirming a frame structure at an RS in a multihop relay wireless communication system, includes, when a control signal containing frame information is received from a serving node, confirming a frame structure and time point information for commencing a relay service using the frame structure from the frame information; and communicating using the frame structure at the time point for commencing the relay service.

According to the aspect of the present invention, a serving node in a multihop relay wireless communication system includes a frame structure confirmer for confirming a structure of a frame used to communicate with a child RS or Mobile Stations in a service coverage area; a message generator for generating a control message comprising the frame structure information; and a transmitter for sending the control message to the child RS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for selectively utilizing a frame structure adequate for a system environment in a multihop relay wireless communication system. The system environment includes a length of the frame.

The wireless communication system adopts a Time Division Duplex (TDD) scheme and an Orthogonal Frequency Division Multiple Access (OFDMA) scheme by way of example, and the present invention is applicable to communication systems based on other multiple access schemes and other division duplex schemes.

Figure 1:
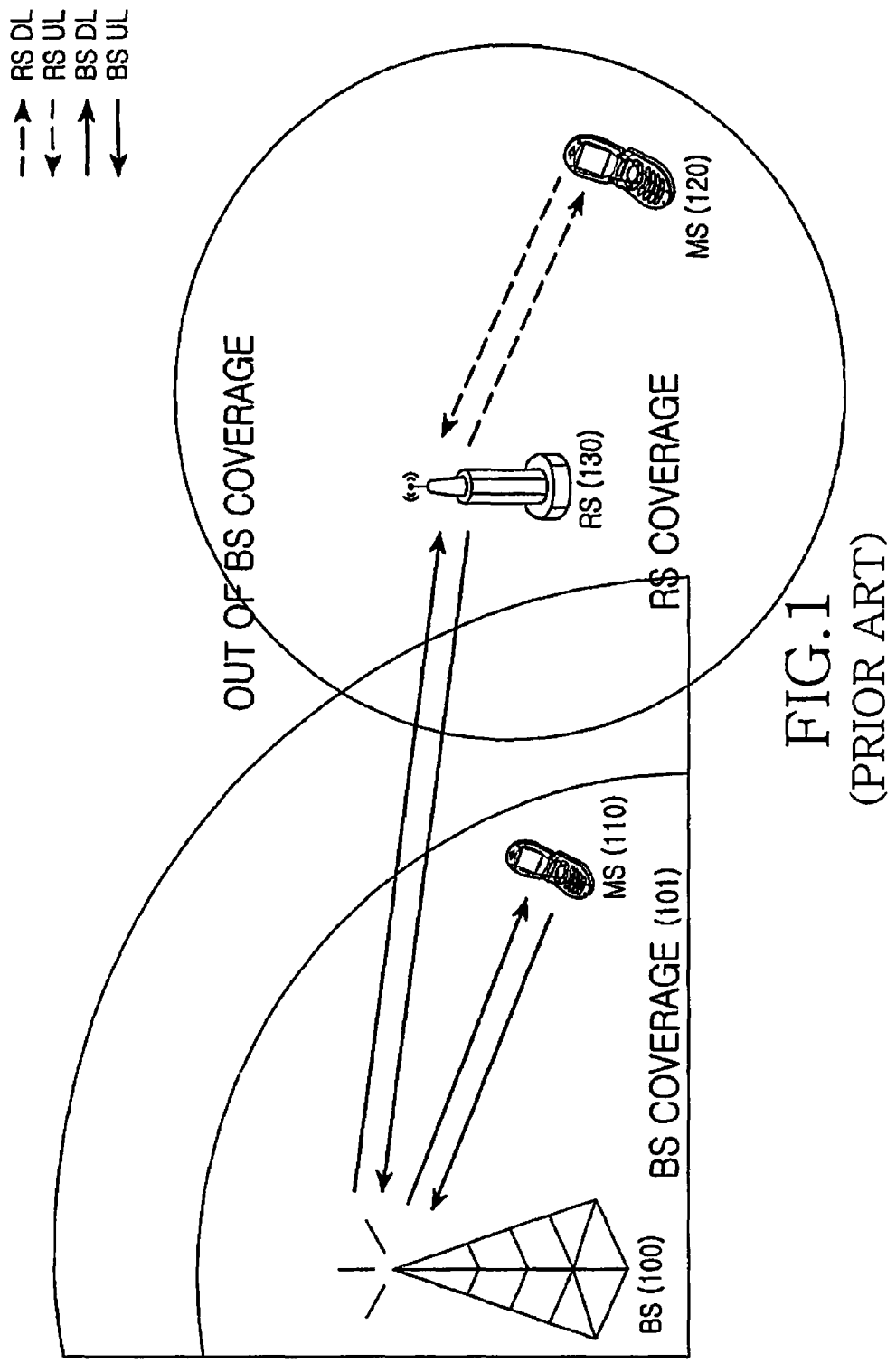
FIG. 1 illustrates a general multihop relay wireless communication system.
Figure 2:
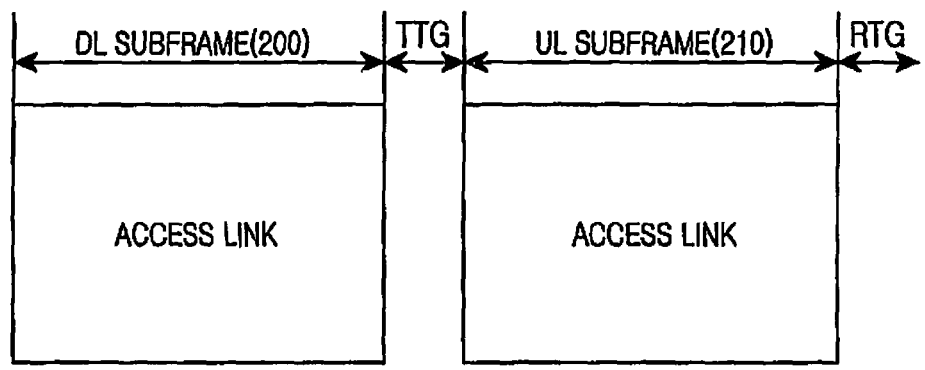
FIG. 2 illustrates a frame structure of a conventional wireless communication system.
Figure 3:
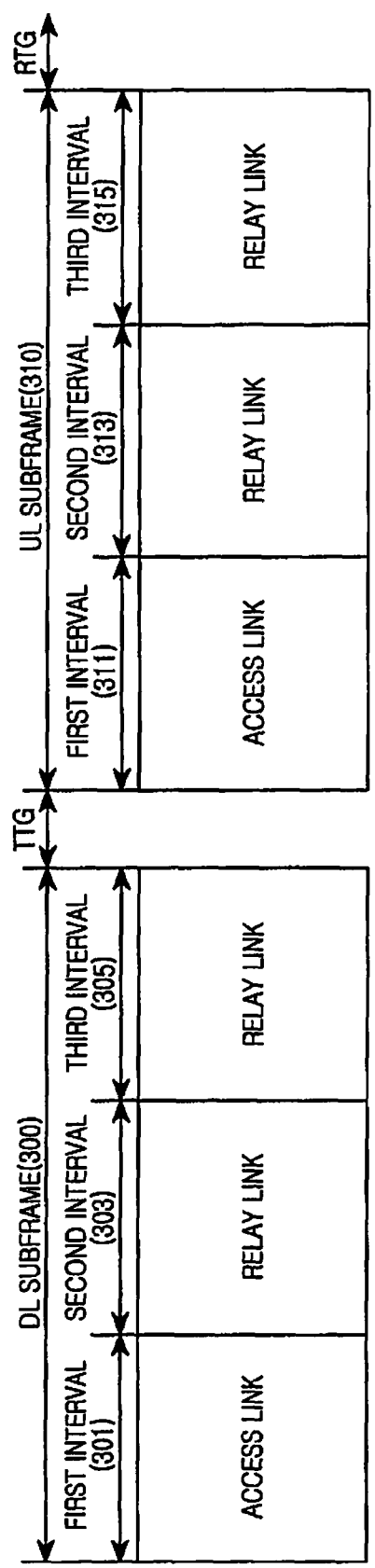
FIG. 3 illustrates a frame structure of a multihop relay wireless communication system according to one embodiment of the present invention.
Figure 5:
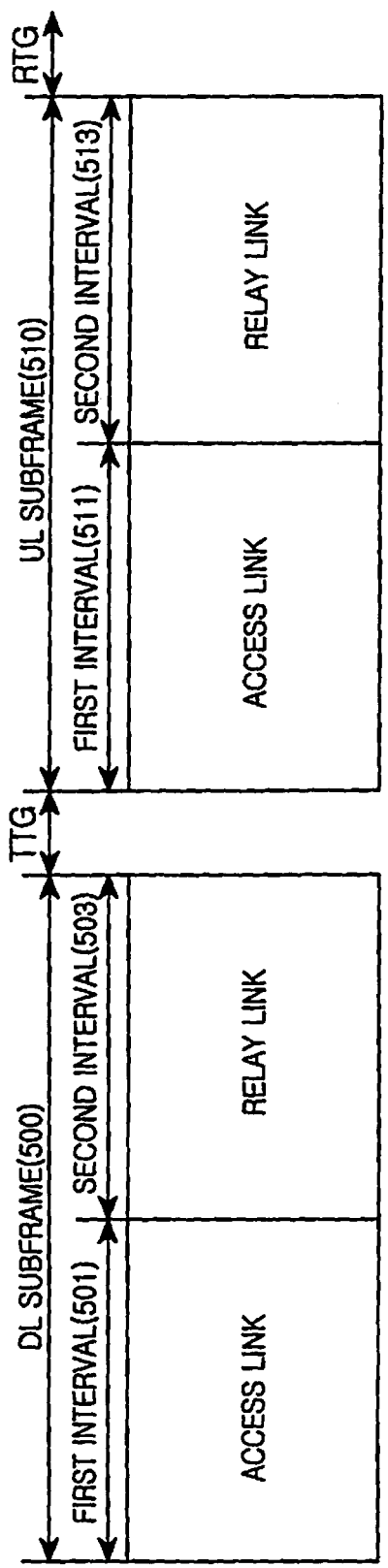
FIG. 5 illustrates a frame structure of a multihop relay wireless communication system according to another embodiment of the present invention.

To support the multihop relay scheme, the wireless communication system communicates using a frame structure of FIG. 3 or FIG. 5.

FIG. 3 illustrates a frame structure of a multihop relay wireless communication system according to one embodiment of the present invention.

The frame of FIG. 3 includes a DownLink (DL) subframe 300 and an UpLink (UL) subframe 310. The DL subframe 300 and the UL subframe 310 are divided to first intervals 301 and 311, second intervals 303 and 313, and third intervals 305 and 315, respectively, using time resources.

The first intervals 301 and 311 include a subframe for a Base Station (BS)-Mobile Station (MS) link and a subframe for a Relay Station (RS)-MS link.

The second intervals 303 and 313 include a subframe for a BS-MS link, a subframe for an RS-RS link, and a subframe for an odd-hop end RS-MS link.

The third intervals 305 and 315 include a subframe for a BS-one-hop RS link, a subframe for an RS-RS link, and a subframe for an even-hop end RS-MS link.

In the frame structure, a time guard interval Transmit/receive Transition Gap (TTG) is inserted between the DL subframe 300 and the UL subframe 310, and a time guard interval Receive/transmit Transition Gap (RTG) is inserted between frames.

Figure 4:
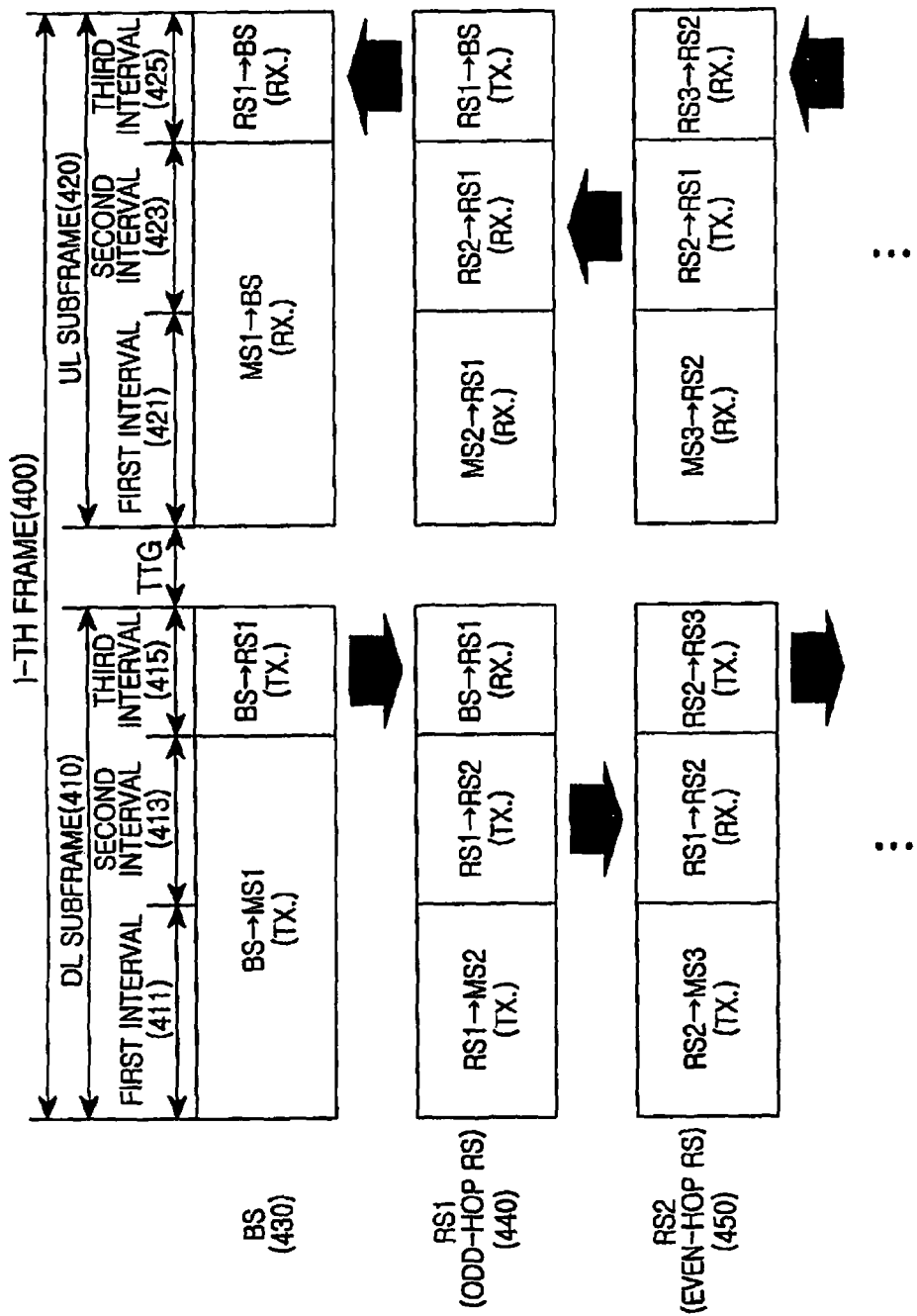
FIG. 4 illustrates a frame operation of the multihop relay wireless communication system according to one embodiment of the present invention.

When the wireless communication system communicates using the frame of FIG. 3, the BS and the RS operate as shown in FIG. 4.

FIG. 4 illustrates a frame operation of the multihop relay wireless communication system according to one embodiment of the present invention.

An i-th frame 400 of FIG. 4 includes a DL subframe 410 and a UL subframe 420. The DL subframe 410 and the UL subframe 420 are divided to first intervals 411 and 421, second intervals 413 and 423, and third intervals 415 and 425, respectively, using time resources.

When the wireless communication system communicates using the frame structure of FIG. 3, a BS 430 communicates with an MS1 in its service coverage area over the first intervals 411 and 421 and the second intervals 413 and 423 of the DL subframe 410 and the UL subframe 420. The BS 430 communicates with a one-hop RS over the third intervals 415 and 425. Herein, the MS1 represents MSs in the service coverage area of the BS 430.

An odd-hop RS 440 communicates with an MS2 in its service coverage area over the first intervals 411 and 421. Herein, the MS2 represents MSs in the service coverage area of the odd-hop RS 440.

The odd-hop RS 440 communicates with a next even-hop RS 450 over the second intervals 413 and 423. If the odd-hop RS 440 is an end-hop RS, the odd-hop RS 440 communicates with the MS2 over the second intervals 413 and 423.

The odd-hop RS 440 communicates with a previous even-hop RS over the third intervals 415 and 425. If the odd-hop RS 440 is a one-hop RS, the one-hop RS 440 communicates with the BS over the third intervals 415 and 425.

The even-hop RS 450 communicates with an MS3 in its service coverage area over the first intervals 411 and 412. Herein, the MS3 represents MSs in the service coverage area of the even-hop RS 450.

The even-hop RS 450 communicates with the previous odd-hop RS 440 over the second intervals 413 and 423.

The even-hop RS 450 communicates with a next odd-hop RS over the third intervals 415 and 425. If the even-hop RS 450 is the end-hop RS, the even-hop RS 450 communicates with the MS3.

FIG. 5 illustrates a frame structure of a multihop relay wireless communication system according to another embodiment of the present invention.

The frame of FIG. 5 includes a DL subframe 500 and a UL subframe 510. The DL subframe 500 and the UL subframe 510 are divided to first intervals 501 and 511 and second intervals 503 and 513, respectively, using time resources.

The first intervals 501 and 511 include a subframe for a BS-MS link and a subframe for an RS-MS link.

The second intervals 503 and 513 include a subframe for a BS-one-hop RS link, a subframe for an RS-RS link, and a subframe for an end RS-MS link.

In the frame structure, a time guard interval TTG is inserted between the DL subframe 500 and the UL subframe 510 and a time guard interval RTG is inserted between frames.

Figure 6:
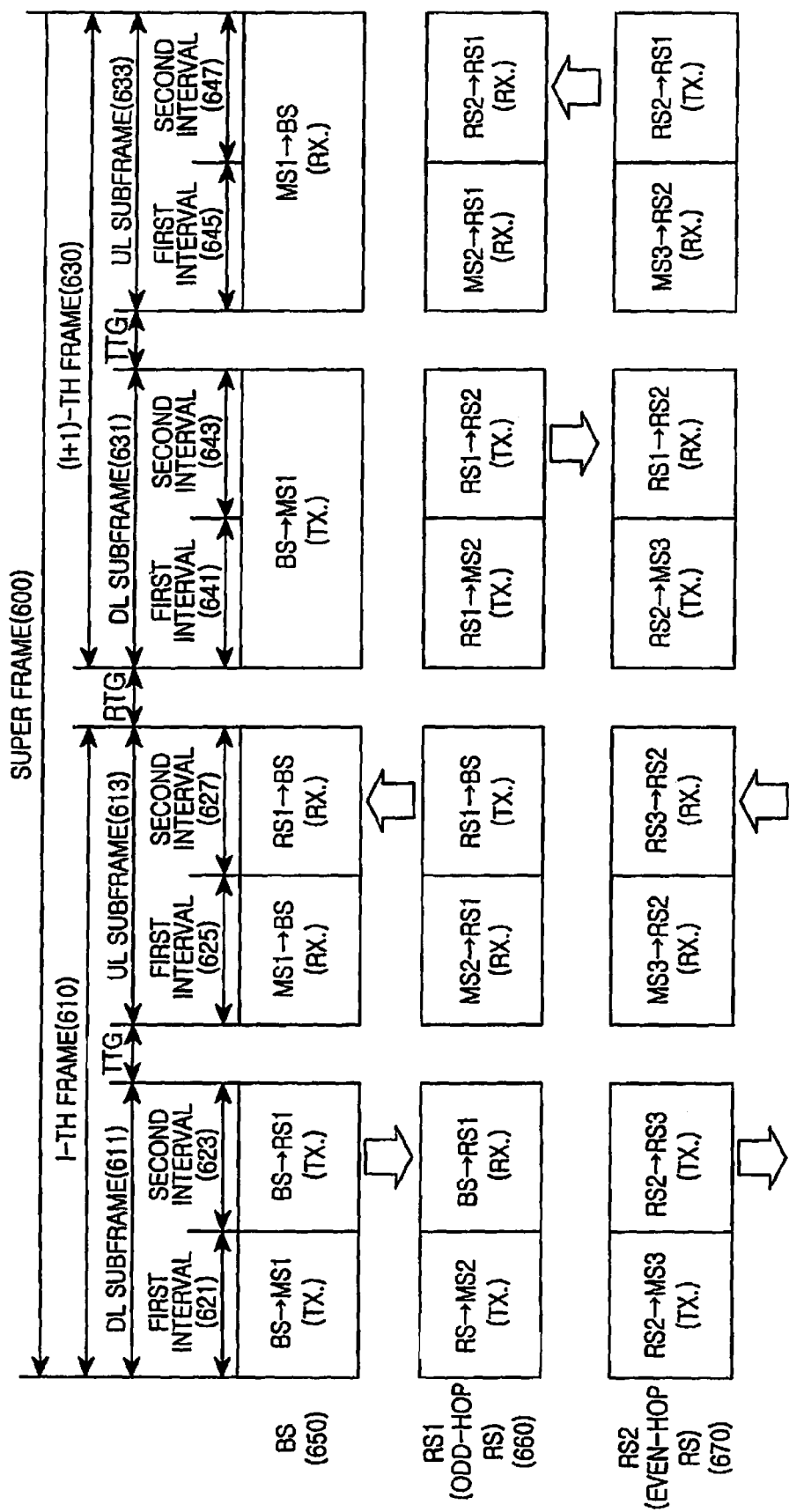
FIG. 6 illustrates a frame operation of the multihop relay wireless communication system according to another embodiment of the present invention.

When the wireless communication system communicates using the frame of FIG. 5 and using the multiple hops, the wireless communication system constitutes two frames as a single super frame as shown in FIG. 6. In this case, the BS and the RS of the wireless communication system operate as shown in FIG. 6.

FIG. 6 illustrates a frame operation of the multihop relay wireless communication system according to another embodiment of the present invention.

An i-th frame 610 and a (i+1)-th frame 630 of FIG. 6 include DL subframes 611 and 631 and UL subframes 613 and 333, respectively. The subframes 611, 613, 631 and 633 are divided to first intervals 621, 625, 641 and 645 and second intervals 623, 627, 643 and 647, respectively, using time resources.

When the wireless communication system communicates using the frame structure of FIG. 5, a BS 650 communicates with an MS1 in its service coverage area over the first intervals 621, 625, 641 and 645. Herein, the MS1 represents MSs in the service coverage area of the BS 650.

The BS 650 communicates with a one-hop RS over the second intervals 623 and 627 of the i-th frame 610, and communicates with the MS1 over the second intervals 633 and 637 of the (i+1)-th frame 630.

An odd-hop RS 660 communicates with an MS2 in its service coverage area over the first intervals 621, 625, 641 and 645. Herein, the MS2 represents MSs in the service coverage area of the odd-hop RS 660.

The odd-hop RS 660 communicates with a previous even-hop RS over the second intervals 623 and 637 of the i-th frame 610, and communicates with a next even-hop RS over the second intervals 633 and 637 of the (i+1)-th frame 630.

If the odd-hop RS 660 is the one-hop RS, the one-hop RS 660 communicates with the BS over the second intervals 623 and 627 of the i-th frame 610. The one-hop RS 660 communicates with a two-hop RS over the second intervals 633 and 637 of the (i+1)-th frame 630.

If the odd-hop RS 660 is an end-hop RS, the end-hop RS 660 communicates with the MS2 over the second intervals 633 and 637 of the (i+1)-th frame 630.

An even-hop RS 670 communicates with an MS3 in its service coverage area over the intervals 621, 625, 641 and 645. Herein, the MS3 represents MSs in the service coverage area of the even-hop RS 670.

The even-hop RS 670 communicates with a next odd-hop RS over the second intervals 623 and 627 of the i-th frame 610 and communicates with a previous odd-hop RS over the second intervals 633 and 637 of the (i+1)-th frame 630.

If the even-hop RS 670 is an end-hop RS, the end-hop RS 670 communicates with the MS3 over the second intervals 623 and 627 of the i-th frame 610.

As above, the wireless communication system can support the multihop relay scheme with the frame structure of FIG. 3 or 5. The used frame structures of FIGS. 3 and 5 used in the wireless communication system have different features.

When the wireless communication system uses the frame structure of FIG. 3, the RS receives a signal from the BS or a parent RS and relays the signal to a child RS or the MS over one frame.

In this case, advantageously, the RS can reduce the transmission delay by relaying the signal over one frame. When the second interval of the frame is changed to the third interval, the RS switches its operation. For the operation switch of the RS, the operation switch resource is required between the second interval and the third interval of the frame.

When the wireless communication system utilizes the frame structure of FIG. 5, the RS receives a signal from the BS or the parent RS during the first frame and relays the signal to the child RS or the MS during the second frame.

In this case, since the RS relays the signal over two frames, the transmission delay is caused. Yet, the resources required for the operation switch of the RS can be reduced by receiving the signal over the first frame and sending the signal over the second frame.

The wireless communication system can make use of a frame of a different length per system. For example, the frame of a length ranging 2~20 ms can be used per system. The length and the structure of the frame set for one system is commonly used by every node in the system. That is, while the systems can communicate using the frame structure of the different lengths and structures, every node in the same system communicates using the same frame length and structure.

Using a short frame (e.g., 2 ms), the operation switch resource in the frame structure of FIG. 3 requires a great amount of resources because of the short frame length. In this case, the operation switch resource considerably affects the performance of the wireless communication system, compared to the transmission delay occurring when the wireless communication system uses the frame structure of FIG. 5.

Therefore, it is more efficient that the wireless communication system using the short frame supports the relay service using the frame structure of FIG. 5 rather than the frame structure of FIG. 3.

Using a long frame (e.g., 20 ms), the wireless communication system is not greatly affected by the operation switch resource of the frame structure of FIG. 3. Instead, the wireless communication system is seriously affected by the transmission delay in the frame structure of FIG. 5 rather than the operation switch resource.

Therefore, it is more efficient that the wireless communication system using the long frame supports the relay service using the frame structure of FIG. 3 rather than the frame structure of FIG. 5.

As mentioned above, it is more efficient that the multihop relay wireless communication system selectively utilizes the frame structure adequate for the system environment (e.g., frame length).

Now, operations of the BS and the RS for selectively using the adequate frame structure for the system environment in the wireless communication system will be described. While frame structure information is transmitted from the BS to the RS by way of example, the frame structure information can be transmitted from a parent RS to a child RS.

Figure 7:
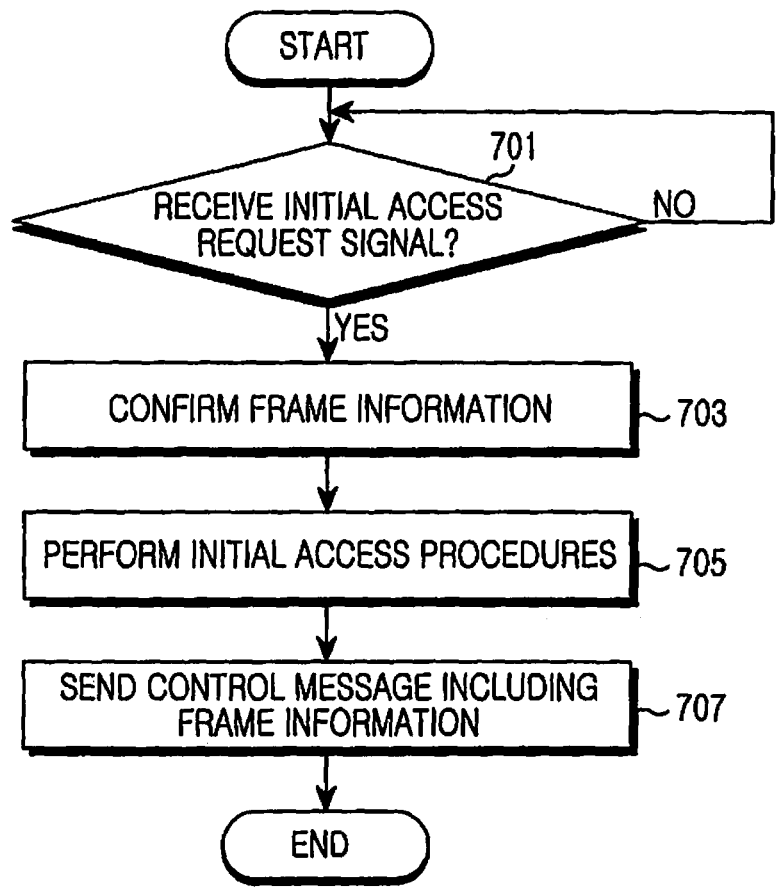
FIG. 7 illustrates a BS operation of the multihop relay wireless communication system according to one embodiment of the present invention.
Figure 8:
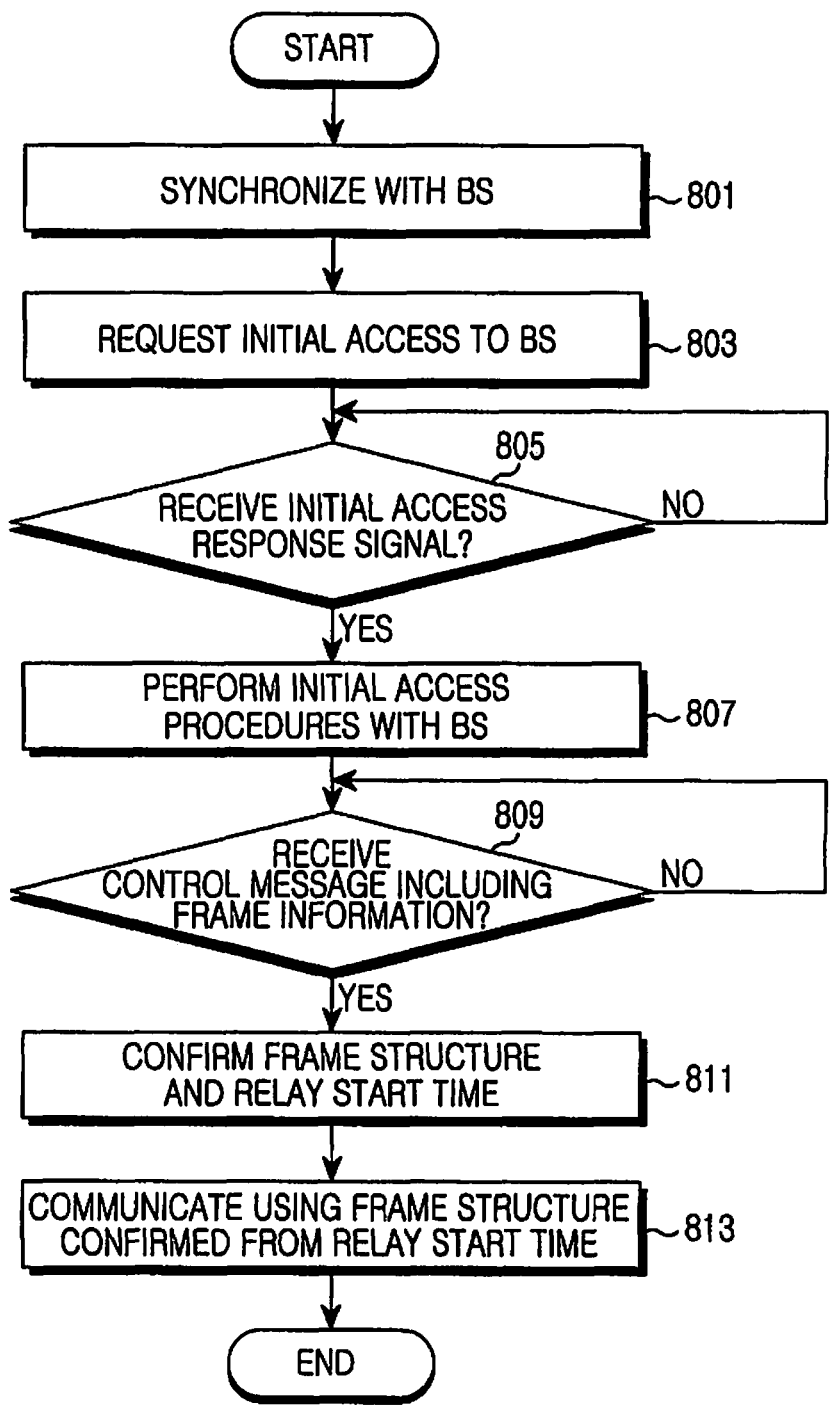
FIG. 8 illustrates an RS operation of the multihop relay wireless communication system according to one embodiment of the present invention.

FIGS. 7 and 8 illustrate the operation of the BS for providing frame information of the system and the operation of the RS for receiving the frame information in the initial access in the wireless communication system. The frame information sent by the BS includes a frame structure selected based on the system environment (e.g., frame length) and a frame number for starting the relay service using the frame structure. Alternatively, the frame information sent by the BS can include start position information of an area where the RS communicates with the parent node for the relay service after the initial access.

FIG. 7 illustrates the BS operation of the multihop relay wireless communication system according to one embodiment of the present invention.

In step 701, the BS determines if an initial access request signal is received from a certain RS. The RS requests and executes the initial access using the area where the BS communicates with the MS.

For example, when the wireless communication system uses the frame structure of FIG. 3, the BS determines if the RS requests the initial access over the first intervals 301 and 311. When the wireless communication system uses the frame structure of FIG. 5, the BS determines if the RS requests the initial access over the first intervals 501 and 511. Next, the BS performs the initial access with the RS over the first intervals 301, 311, 501 and 511.

Upon receiving the initial access request signal from the RS, the BS confirms frame information of the wireless communication system in step 703. For example, the frame information includes the frame structure used in the wireless communication system based on the system environment (e.g., frame length) and a frame number for the RS requesting the initial access to start the relay service using the frame structure.

When the RS requests the initial access, the BS confirms the frame information prior to the initial access procedures with the RS. Alternatively, the BS can confirm the frame information during the initial access procedures with the RS. Alternatively, the BS can confirm the frame information before the initial request signal is received from the RS.

After confirming the frame information, the BS determines whether to accept the initial access of the RS by checking its communication condition (e.g., load) in step 705. Accepting the initial access of the RS, the BS performs the initial access procedures with the RS.

Next, the BS sends a control message including the frame information (e.g., the frame structure and the frame number) of the system to the RS in the process of the initial access in step 707. In doing so, the wireless communication system can index every supportable frame structure. Accordingly, the BS can send the control message to the RS by including the index of the frame structure used by the wireless communication system. For instance, the BS sends the frame information to the RS using a Downlink Channel Descriptor (DCD) message. Alternatively, the BS sends the frame information using a last control message of the initial access procedures. That is, when the last procedure of the initial access is a registration procedure, the BS sends a registration response message including the frame information to the RS.

Alternatively, the BS can send the control message by including only the start position information of the area where the RS starts the relay service. Next, the BS sends the control message of the area where the RS commences the relay service, to the RS by including the frame structure and the frame number of the wireless communication system.

Next, the BS finishes this process.

FIG. 8 illustrates the RS operation of the multihop relay wireless communication system according to one embodiment of the present invention.

In step 801, the RS synchronizes with the BS through a sync channel received from the BS.

After synchronizing with the BS, the RS sends an initial access request signal to the BS for the initial access in step 803.

In step 805, the RS determines if an initial access response signal is received from the BS.

Upon receiving the initial access response signal, the RS performs the initial access procedures with the BS in step 807.

In step 809, the RS determines if a control message including the frame information of the wireless communication system is received in the process of the initial access procedures. The control message indicates the DCD message of the access link of FIG. 3 or 5 or the control message of the last procedure of the initial access. For example, the frame information includes the frame structure information of the wireless communication system and the frame number for the relay service. Alternatively, the frame information may include the start position information of the area where the RS commences the relay service.

When receiving the control message including the frame information, the RS confirms the frame structure used by the BS and the frame number for starting the relay service using the frame structure in the control message in step 811. Herein, the frame number indicates the frame number for the RS to commence the service using the relay link rather than the access link.

Alternatively, when the control message includes the start position of the area for the relay service, the RS confirms from the control message area information for starting the relay service. Next, the RS receives the control message including the frame structure and the frame number of the wireless communication system from the BS over the area for starting the relay service and confirms the frame structure and the frame number.

After confirming the frame structure and the frame number, the RS communicates using the frame structure from the relay servicing point based on the frame number in step 813.

Next, the RS finishes this process.

In the above embodiment of the present invention, when the RS initially accesses, the BS sends the frame information to the RS using the DCD message or the control message.

Alternatively, the BS can send the frame information using the DCD message by periods. Hence, the RS can receive the DCD message from the BS prior to the initial access request according to the transmission period of the DCD message and confirm the frame information. In this case, the RS acquires the frame information from the received DCD message while synchronizing with the BS.

The RS can confirm the frame information by periodically receiving the DCD message from the BS during the initial access procedures. Herein, the initial access procedures of the RS starts when the RS synchronizes with the BS and ends when the initial access is completed. The BS can provide the frame information to the RS using a separate message as well as the DCD message.

When the environment changes, the wireless communication system can alter the frame structure in accordance with the changed system environment. When the frame structure is altered, the BS sends the changed frame structure information to the RS as shown in FIG. 9.

Figure 9:
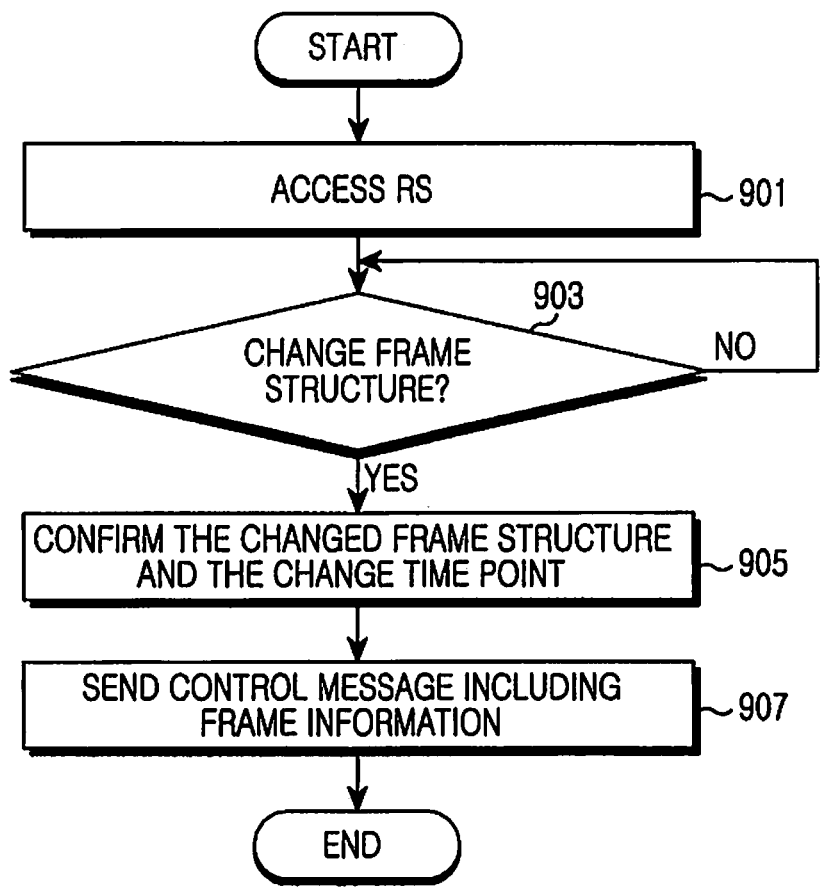
FIG. 9 illustrates a BS operation of the multihop relay wireless communication system according to another embodiment of the present invention.

FIG. 9 illustrates a BS operation of the multihop relay wireless communication system according to another embodiment of the present invention.

In step 901, the BS communicates with the RS by accessing the RS. To communicate with the RS, the BS utilizes the frame structure of FIG. 3 or 5 according to the system environment.

In step 903, the BS determines whether to change the frame structure due to the changed environment of the wireless communication system.

To change the frame structure, the BS confirms the altered frame structure and the frame number to apply the frame structure in step 905. Every node in the wireless communication system of the BS should communicate using the same frame structure at the same time. To this end, the BS sends the changed frame structure information to every node on the multiple hops by sending the frame number so that the nodes can communicate using the altered frame structure at the same time.

After confirming the changed frame structure and the frame number, the BS transmits a frame structure change control message including the frame structure and the frame number to the RS in step 907. For instance, the BS sends the DCD message of the relay link of FIG. 3 or 5 by including the altered frame structure and the frame number. Alternatively, the BS sends an RS DL-MAP of the relay link of FIG. 3 or 5 by including the altered frame structure and the frame number. In doing so, the BS includes the frame structure and the frame number as Information Element (IE) information or a field of the RS DL-MAP. The BS may include the frame structure and the frame number as a field in the physical (PHY) synchronization of the RS DL-MAP.

Next, the BS finishes this process.

In this embodiment of the present invention, the BS selects the frame structure of FIG. 3 or FIG. 5 to communicate with the RS based on the system environment and transmits the selected frame information to the RS.

Alternatively, when the wireless communication system includes multiple hops, the parent RS can include a child RS and send the frame structure information to the child RS.

When the BS and the parent RS send the frame information to the child RS in the wireless communication system, the BS and the parent RS can generate the RS DL-MAP including the frame information as shown in Table 1 and send the RS DL-MAP to the child RS.

TABLE 1

| Syntax | Size | Notes |
| --- | --- | --- |
| Frame_Type_IE( ) | | |
| Extended DUIUC | 4 bits | Frame_Type = 0xxx |
| Length | 4 bits | Length = 0x03 |
| Frame Unit change | 1 bit | '1' indicates the start that enables 2 frame units '0' indicates the start that enables 1 frame unit |
| Frame number | 7 bits | Frame number that enables 2 frame units |

Frame_Type_IE includes Frame Unit change information indicating the frame structure information to be used in the system, and Frame number information indicating the frame number to start the communication using the frame structure. For example, the Frame Unit change information '1' signifies that the frame structure is used for extension to three or more hops using two frames, and the Frame Unit change information '0' signifies the 2-hop frame structure using one frame.

Figure 10:
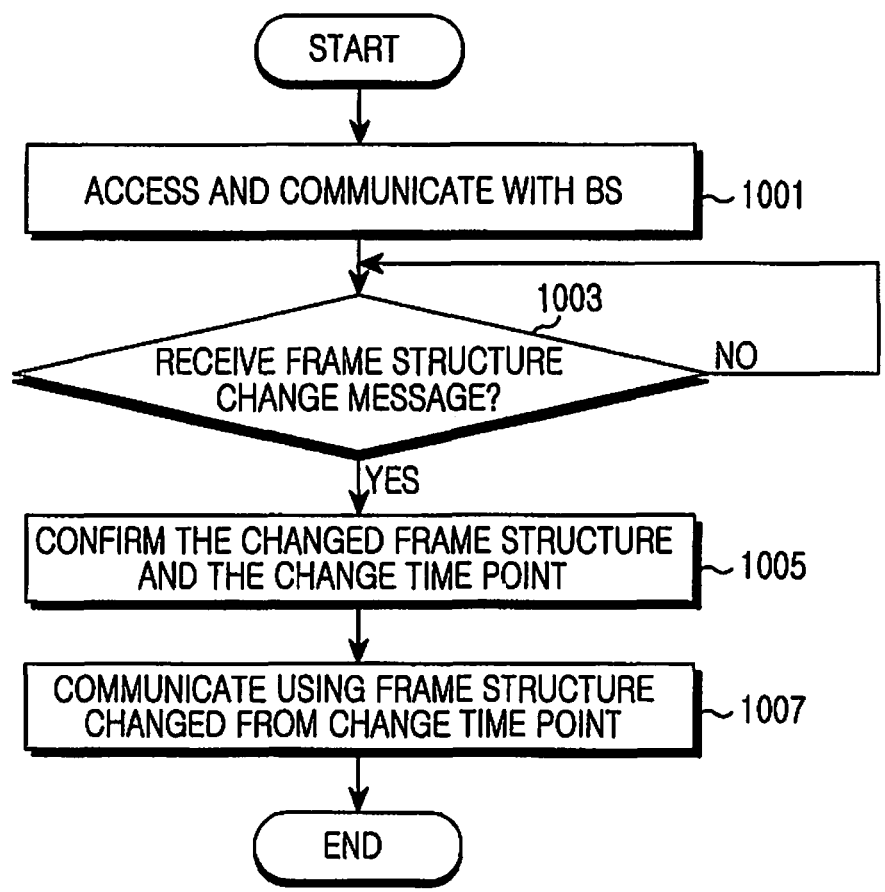
FIG. 10 illustrates an RS operation of the multihop relay wireless communication system according to another embodiment of the present invention.

As such, when the BS sends the frame structure change information, the RS acquires the frame structure change information as shown in FIG. 10.

FIG. 10 illustrates an RS operation of the multihop relay wireless communication system according to another embodiment of the present invention.

In step 1001, the RS accesses and communicates with the BS. For example, the RS communicates with the BS using the frame structure of FIG. 3 or 5 provided from the BS based on the system environment.

In step 1003, the RS determines if a frame structure change message is received from the BS. The frame structure change message indicates the DCD message or the DL-MAP in the relay link including the frame structure change information. The RS confirms the frame structure change information in the DCD message or the DL-MAP in the relay link of FIG. 3 or 5.

When receiving the frame structure change message, the RS confirms the changed frame structure and the frame number from the frame structure change message in step 1005. The frame number indicates the time point information for altering the frame structure.

After confirming the frame structure and the frame number, the RS communicates by changing to the confirmed frame structure from the confirmed frame number in step 1007.

Next, the RS finishes this process.

In this embodiment of the present invention, the RS acquires over the relay link the frame information from the DCD message or the DL-MAP received from the BS. Alternatively, the RS can acquire the frame information from a separate message defined to send the frame information over the relay link.

Now, a structure of the BS or the parent RS for sending the frame structure and the frame number to the child RS in the wireless communication system is explained. Since the BS and the parent RS are constructed the same, the structure of the BS is described by way of example.

Figure 11:
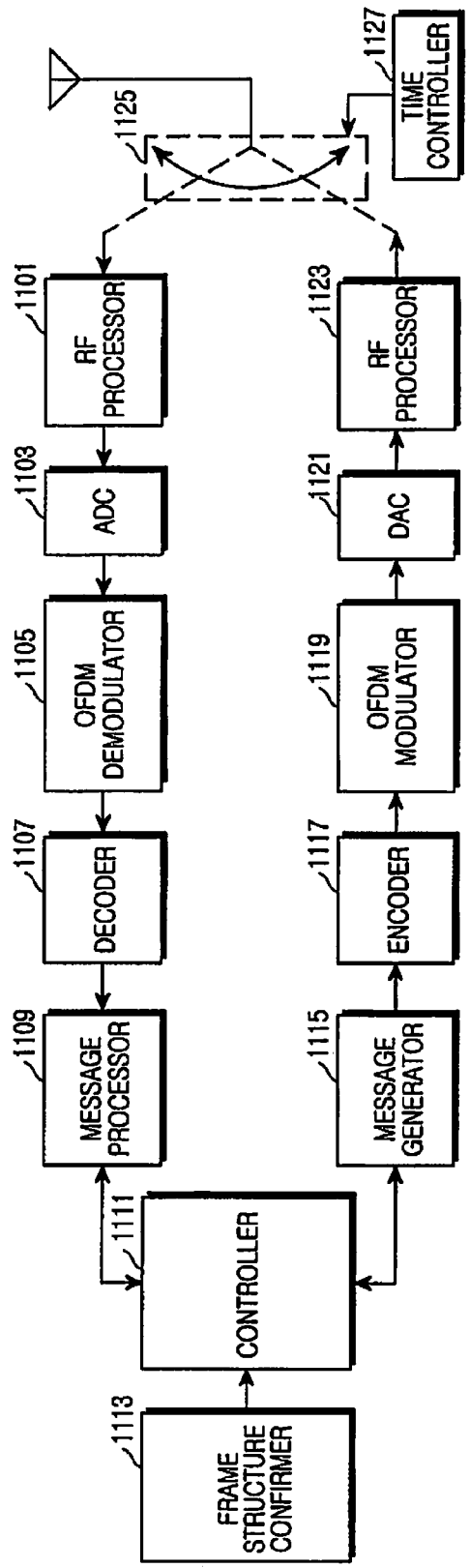
FIG. 11 illustrates the BS in the multihop relay wireless communication system according to the present invention.

FIG. 11 is a block diagram of the BS in the multihop relay wireless communication system according to the present invention.

The BS of FIG. 11 includes Radio Frequency (RF) processors 1101 and 1123, an Analog/Digital Converter (ADC) 1103, an Orthogonal Frequency Division Multiplexing (OFDM) demodulator 1105, a decoder 1107, a message processor 1109, a controller 1111, a frame structure confirmer 1113, a message generator 1115, an encoder 1117, an OFDM modulator 1119, a Digital/Analog Converter (DAC) 1121, a switch 1125, and a time controller 1127.

The time controller 1127 controls a switching operation of the switch 1125 based on the frame synchronization. For example, the time controller 1127 controls the switch 1125 to connect an antenna to the RF processor 1101 of the receiving end during a signal Rx interval, and the time controller 1127 controls the switch 1125 to connect the antenna to the RF processor 1123 of the transmitting end during a signal Tx interval.

In the Rx interval, the RF processor 1101 down-converts an RF signal received on the antenna to a baseband analog signal. The ADC 1103 converts the analog signal fed from the RF processor 1101 to sample data. The OFDM demodulator 1105 outputs frequency domain data by fast Fourier transforming the sample data fed from the ADC 1103.

The decoder 1107 selects subcarrier data to actually receive from the frequency domain data fed from the OFDM demodulator 1105, demodulates and decodes the selected data according to a preset modulation level (Modulation and Coding Scheme (MCS) level).

The message processor 1109 decomposes a control message provided from the decoder 1107 and provides the result to the controller 1111. For example, the message processor 1109 extracts an initial access request signal of the RS as shown in FIG. 7 and provides the extracted signal to the controller 1111.

The controller 1111 processes the information fed from the message processor 1109 and provides the result to the message generator 1115. When the initial access request of the RS is confirmed or the frame structure is altered according to the change of the system environment, the controller 1111 confirms the frame structure of the wireless communication system through the frame structure confirmer 1113. Next, the controller 1111 provides the frame structure information to the message generator 1115.

The frame structure confirmer 1113 confirms the frame structure based on the environment information (e.g., frame length) of the wireless communication system of the BS.

In the Tx interval, the message generator 1115 generates a message with the information provided from the controller 1111 and outputs the generated message to the encoder 1117 of the physical layer. For example, in the initial access of the RS, the message generator 1115 generates the DCD message including the frame structure and the frame time, which are provided from the controller 1111, to communicate with the RS for the relay service over the access link interval of FIG. 3 or 5, and outputs the DCD message to the encoder 1117. Alternatively, the message generator 1115 may output to the encoder 1117 the control message of the last procedure of the initial access procedures of the RS by including the frame structure and the frame number. Alternatively, the message generator 1115 generates a control message including the start position information of the area for starting the relay service over the access link interval of FIG. 3 or 5 and outputs the control message to the encoder 1117. Next, the message generator 1115 outputs a control message including the frame structure and the frame time for communicating with the RS over the relay link interval of FIG. 3 or 5 and outputs the control message to the encoder 1117.

If the frame structure is changed while the RS is accessed, the message generator 1115 generates the DCD message or the DL-MAP including the changed frame structure and the frame time provided from the controller 1111 over the relay link interval of FIG. 3 or 5, and outputs the generated message to the encoder 1117.

The encoder 1117 encodes and modulates the data fed from the message generator 1115 according to the preset modulation level (MCS level). The OFDM modulator 1119 outputs sample data (OFDM symbols) by inverse fast Fourier transforming the data fed from the encoder 1117. The DAC 1121 converts the sample data fed from the OFDM modulator 1119 to an analog signal. The RF processor 1123 up-converts the baseband analog signal fed from the DAC 1121 to an RF signal and transmits the RF signal via the antenna.

As constructed above, the controller 1111, which is a protocol controller, controls the message processor 1109, the frame structure confirmer 1113, and the message generator 1115. In other words, the controller 1111 can function as the message processor 1109, the frame structure confirmer 1113, and the message generator 1115. Hence, the message processor 1109, the frame structure confirmer 1113, and the message generator 1115 are separately provided to distinguish their functions. Hence, in the actual implementation, the controller 1111 can process all or part of the message processor 1109, the frame structure confirmer 1113, and the message generator 1115.

In this embodiment of the present invention, the wireless communication system communicates using one of the two frame structures of FIGS. 3 and 5 depending on the system environment. However, the present invention is applicable to other frame structures supportable in the wireless communication system.

If a mobile RS is handed over and its serving BS or parent RS is changed, the RS should acquire the frame structure of the target BS or the target parent RS of the handover in advance. For doing so, the BS or the parent RS transmits information of neighbor nodes (e.g., neighbor BS or neighbor parent RSs) to the child RS by including frame structure information of the neighbor nodes. Thus, the RS can acquire the frame structure of the neighbor BS or the neighbor parent RSs from the neighbor node information message received from the serving BS or the serving parent RS.

As set forth above, the parent node (e.g., BS and parent RS) in the multihop relay wireless communication system selects the adequate frame structure for the system environment (e.g., frame length) and transmits the selected frame structure information to the child RS. Therefore, the frame structure adequate for the system environment can be used, and the transmission delay and the tradeoff between the overheads in each frame structure can be freely selected.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting frame information at a Base Station (BS) in a multihop relay wireless communication system, the method comprising:
  generating a control signal including the frame information;
  transmitting the control signal including the frame information to a Relay Station (RS);
  when a frame structure used to communicate with the RS is changed, confirming the changed frame structure and information of a time when accessing RSs change the frame structure; and
  transmitting a control signal containing the changed frame structure and the change time information to the RS,
    wherein the frame information includes structure information of a frame for relay service, such that the structure information distinguishes between subframes corresponding to a relay service and subframes corresponding to direct communications between the BS and at least one Mobile Station (MS), and
  wherein the structure information includes information indicating whether the frame for relay service is a single frame or a super frame which unites at least two single frames.

2. The method of claim 1, wherein the structure information further includes a number of subframes constituting the frame used to communicate with the RS.

3. The method of claim 1, wherein the structure information is determined according to system environment information including length information of the frame used in the wireless communication system.

4. The method of claim 1, further comprising:
  initially accessing the RS according to an initial access request from the RS,
  wherein, before the initial access request is received from the RS, in the process of the initial access to the RS, or after the initial access to the RS, a control signal containing the frame information is generated and transmitted to the RS.

5. The method of claim 1, wherein the control signal includes a Downlink Channel Descriptor (DCD) message or a control message of a last procedure of initial access procedures of the RS.

6. The method of claim 1, wherein the control signal containing the changed frame structure and the change time information is one of a DCD message, a DownLink (DL)-MAP message, and a frame structure change message.

7. The method of claim 6, wherein the DL-MAP message includes a frame structure and the frame structure change time information as one of a field value, an Information Element (IE), and a physical (PHY) synchronization field value.

8. The method of claim 6, wherein the DL-MAP message includes the changed frame structure by dividing into a number of frames used for the communication.

9. A method for confirming a frame structure at a Relay Station (RS) in a multihop relay wireless communication system, the method comprising:
when a control signal containing frame information is received from a Base Station (BS), confirming from the frame information a frame structure of a frame for relay service, such that the structure information distinguishes between subframes corresponding to a relay service and subframes corresponding to direct communications between the BS and at least one Mobile Station (MS);
communicating using the frame structure at the time for commencing the relay service;
when a control signal containing frame structure change information is received from the BS while communicating using the frame structure, confirming, from the control signal containing the frame structure change information, a changed frame structure and change time information of the frame structure; and
communicating using the changed frame structure at the frame structure change time, wherein the serving node is a Base Station (BS) or a parent RS,
wherein the frame structure indicates whether the frame for relay service is a single frame or a super frame which unites at least two single frames.

10. The method of claim 9, further comprising:
requesting an initial access to the BS and initially accessing the BS,
wherein the control signal containing the frame information is received before the initial access to the BS is requested, in the process of the initial access, or after the initial access to the BS.

11. The method of claim 9, wherein the control signal containing the frame information includes a Downlink Channel Descriptor (DCD) message or a control message of a last procedure of initial access procedures.

12. The method of claim 9, wherein the control signal containing the frame structure change information is one of a DCD message, a Down Link (DL)-MAP message, and a frame structure change message.

13. The method of claim 12, wherein the DL-MAP message includes the frame structure and the change time point information as one of a field value, an Information Element (IE), and a physical (PHY) synchronization field value.

14. The method of claim 12, wherein the DL-MAP message includes the changed frame structure by dividing into a number of frames used for the communication.

15. The method of claim 9, wherein the structure information further includes information of a time point for the RS to commence the relay service using the frame structure of the frame information.

16. A Base Station (BS) in a multihop relay wireless communication system, the serving node comprising:
a frame structure confirmer for confirming a frame structure used to relay service;
a message generator for generating a control message that includes information of the frame structure; and
a transmitter for sending the control message that includes the information of the frame structure to the RS,
wherein the control message that includes the information of the frame structure further includes structure information of a frame for relay service, such that the structure information distinguishes between subframes corresponding to a relay service and subframes corresponding to direct communications between the BS and at least one Mobile Station (MS),
wherein the structure information includes information indicating whether the frame for relay service is a single frame or a super frame which unites at least two single frames, and
wherein, when a frame structure used to communicate with the RS is changed, the frame structure confirmer confirms the changed frame structure and information of a time when accessing RSs change the frame structure, and the transmitter sends a control message containing the changed frame structure and the change time information to the RS.

17. The BS of claim 16, wherein the frame structure confirmer confirms a frame structure selected based on a system environment that includes a length of the frame used in the wireless communication system.

18. The BS of claim 16, wherein the message generator generates a message that includes the frame structure information and time information for commencing a relay service using the frame structure as one of a Downlink Channel Descriptor (DCD) message and a control message of a last procedure of initial access procedures, and
wherein the control message containing the changed frame structure and the change time information is one of a DCD message, a DL-MAP message, and a frame structure change message.

19. The BS of claim 18, wherein the message generator generates the DL-MAP message that includes the frame structure and the frame structure change time information, as one of a field value, Information Element (IE), and a physical (PHY) synchronization field value.

20. The method of claim 1, wherein the structure information further includes information of a time point for the RS to commence the relay service using the frame structure of the frame information.

21. The BS of claim 16, wherein the structure information further includes information of a time point for the RS to commence the relay service using the frame structure of the frame information.

* * * * *